United States Patent
Fagan (10) Patent No.: US 8,359,855 B1
(45) Date of Patent: Jan. 29, 2013

(54) WAVES AND SEA SWELLS IMITATOR APPARATUS

(76) Inventor: Marcel Fagan, Sunrise, FL (US)

(*) Notice: Subject to any disclaimer, the term of this patent is extended or adjusted under 35 U.S.C. 154(b) by 711 days.

(21) Appl. No.: 12/387,999

(22) Filed: May 12, 2009

Related U.S. Application Data (60) Provisional application No. 61/127,295, filed on May 12, 2008.

(51) Int. Cl.
*F03B 13/18* (2006.01)
*F03B 13/10* (2006.01)
*F03B 13/12* (2006.01)

(52) U.S. Cl. ............... 60/506; 60/497; 60/501; 290/42; 290/53

(58) Field of Classification Search ........... 60/495–507; 290/1 R, 42, 53
See application file for complete search history.

(56) References Cited

U.S. PATENT DOCUMENTS

| | | | |
|---|---|---|---|
| 472,398 A * | 4/1892 | Rosenholz | 290/53 |
| 861,997 A * | 7/1907 | Luck | 60/501 |
| 937,712 A * | 10/1909 | McFarland, Jr. | 60/325 |
| 1,423,115 A * | 7/1922 | Hultberg | 60/506 |
| D134,341 S | 11/1942 | Churchill | |
| 3,269,746 A | 8/1966 | Jonker | |
| 3,604,726 A | 9/1971 | Tracy | |
| 3,716,229 A | 2/1973 | Van Der Cleyen | |
| 4,207,739 A * | 6/1980 | Scarpi | 60/398 |
| 4,248,044 A | 2/1981 | Woodilla | |
| 4,319,454 A | 3/1982 | Lucia | |
| 4,364,715 A * | 12/1982 | Bolding | 417/100 |
| 4,392,061 A * | 7/1983 | Dubois et al. | 290/53 |
| 4,691,513 A * | 9/1987 | Gillilan | 60/495 |
| D306,049 S | 2/1990 | Bancroft | |
| D398,671 S | 9/1998 | Videtto | |
| 7,105,939 B2 | 9/2006 | Bednyak | |
| 2007/0116565 A1 * | 5/2007 | Beane | 416/11 |

* cited by examiner

*Primary Examiner* — Kenneth Bomberg
*Assistant Examiner* — Christopher Jetton (57) ABSTRACT

The apparatus for converting the motions of waves or sea swells into mechanical motion and then into usable energy. A energy transfer medium (101) situated within the unobstructed internal cavity of a containing enclosure (102) in order to recreate the magnitude and direction of a wave or sea swell inside the containing enclosure. The recreated wave consequently generates an imbalance in the mass distribution of the containing enclosure. This allows a pivoting rotating element (103) joint situated at a central point between a base (104) and the containing enclosure to take advantage of the mass imbalance in order to produce movement. A series of energy collecting devices (128) situated on the base harvests this movement and transforms it into usable energy.

20 Claims, 9 Drawing Sheets

FIG. 17

WAVES AND SEA SWELLS IMITATOR APPARATUS

CROSS-REFERENCE TO RELATED APPLICATIONS

This application claims the benefit of provisional application Ser. No. 61/127,295, filed 2008 May 12 by the present inventor.

FEDERAL SPONSORED RESEARCH

Not Applicable

SEQUENCE LISTING OR PROGRAM

Not Applicable

BACKGROUND

1. Field of Invention

The present apparatus relates to wave energy converters more specifically the buoy-type wave energy converters, also known as "point absorbers" because of their ability to harvest energy from all directions at one point in the ocean.

The average wave seen breaking on the beach has a period of between five and twenty seconds. This means that for every minute that passes, anywhere between 5 to 15 waves will pass any randomly selected point in the ocean. The present apparatus is designed to take advantage of this movement in order to create usable energy or to perform work. It can designed to be mounted on a vessel floating in the ocean or it can be designed to float by its own means 2. Prior Art There exist today renewable energy sources such as solar energy and wind energy, but the intermittent nature these energy sources makes them an inadequate source of energy for the present-day society. It is for this reason that other methods of obtaining energy have been sought. One of which consists in making use of the steady predictable forces exerted by the waves in the sea, and more specifically the undulations to which these forces give rise Known at present are various devices and systems for obtaining energy from the sea. But many of these devices and systems such as U.S. Pat. No. 4,248,044, entitled "Apparatus for wave power generation utilizing large mass dynamic energy absorption", are disadvantage in being fragile. In addition to having many of there moving parts exposed to the corrosive elements and violence of the ocean.

Another no less important disadvantage of many of these current systems is their complexity once they have been assembled. This is illustrated in U.S. Pat. No. 4,319,454, entitled "Wave action power plant". This complexity suggests the need for a high degree of maintenance, which often is not compensated by the energy output obtained. This low yield in the long term can lead to dismantling of the installations which use these systems. The present apparatus is intended to remedy these short falls.

SUMMARY

In accordance with one embodiment a wave energy converter compromised of an energy transfer medium situated within a containing enclosure coupled to a base by way of a pivoting rotating element with the movement produced harvested by a series of energy collecting devices.

DRAWINGS

Figures

FIG. 1-A=Primary embodiment top view
FIG. 1-B=Primary embodiment side view
FIG. 2=Side view of embodiment that features the base situated above the other components
FIG. 3=Side view of embodiment that features a Rolling Element as the energy transfer medium
FIG. 4=Side view of embodiment that features a flexible membrane containing enclosure
FIG. 5-A=Side view of embodiment that features a containing enclosure with a stair shaped undersurface
FIG. 5-B=Side view of embodiment that features a containing enclosure with a beveled shaped undersurface
FIG. 6=Movement profile of the containing enclosure via the Pivoting Rotating Element
FIG. 7-A=Magnified side view of the pivoting rotating element with the base situated below
FIG. 7-B=Magnified side view of the pivoting rotating element with the base situated above
FIG. 8=Side view of apparatus before wave encounter
FIG. 9=Side view of apparatus during a wave crest
FIG. 10=Side view of apparatus at the top of a wave crest
FIG. 11=Side view of apparatus during a wave trough
FIG. 12=Side view of apparatus at the bottom of a wave trough
FIG. 14=Side view of embodiment featuring a cone shaped containing enclosure
FIG. 15=Top view of embodiment that features channels in the containing enclosure
FIG. 16=Side view of embodiment featuring a solid material between the containing enclosure and the pivoting rotating element
FIG. 17=3D view of primary embodiment

REFERENCE NUMBERS 101. energy transfer medium
102. containing enclosure
103. pivoting rotating element
104. base
105. rolling element
106. flexible membrane
107. rod
108. holding element
109. gap
110. the area of the containing enclosure directly opposite of wave crest
111. replicated wave (Wave crest)
112. wave crest
114. impact position (Wave crest)
115. wave trough
116. beveled containing enclosure
118. area of the containing enclosure directly above the wave trough
120. replicated wave (Wave trough)
121. impact position (Wave trough)
122. stair shaped containing enclosure
123. cone shaped containing enclosure
124. solid substance
125. solid material
126. very high side wall
127. series of channels
128. series of energy collecting devices

DETAIL DESCRIPTION

Figure 1:
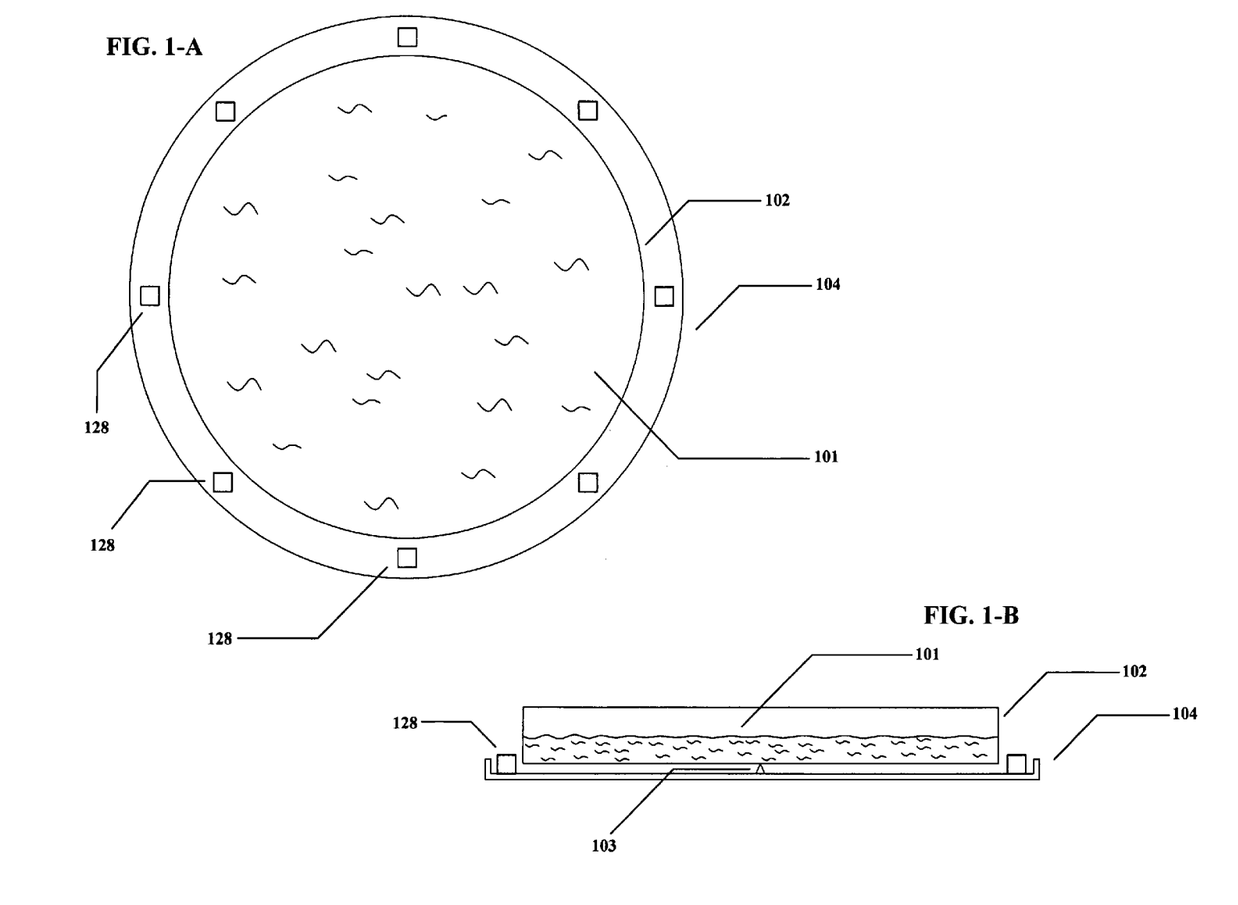

FIGS. 1-A, 1-B, 2, 4, 6, 7-A, 7-B, 9

The Waves and Sea Swells Imitator Apparatus belongs to a family of wave energy converters called the buoy-type wave energy converters, also known as "point absorbers" because of their ability to harvest energy from all directions at one point in the body of water. It operates by creating weight imbalances via recreating of the energy and directional movements of waves in a controlled environment. These imbalances are then transformed into mechanical movement that can then be harvested to produce useful energy.

Figure 3:
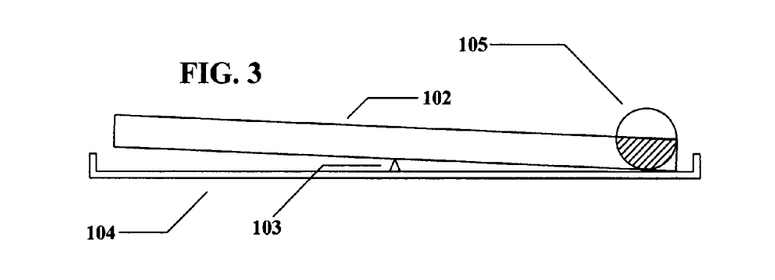

The apparatus consist of five components. The first of these is a energy transfer medium 101, and its purpose would be to imitate the energy and movements of the waves that are manipulating the apparatus. In the embodiment depicted in FIG. 1-A and FIG. 1-B the energy transfer medium takes the form of a liquid (e.g., mercury, water). But in other embodiments it could take the form of a fluidic gel which would ideally be as heavy as or heavier than a similar volume of liquid. The energy transfer medium could also, as shown in FIG. 3, take the form of a rolling element 105 (e.g., sphere). This rolling element it would preferably be composed of a dense substance that might be one or more of the following materials: metal, glass, crystal, ceramic, or stone.

Figure 4:
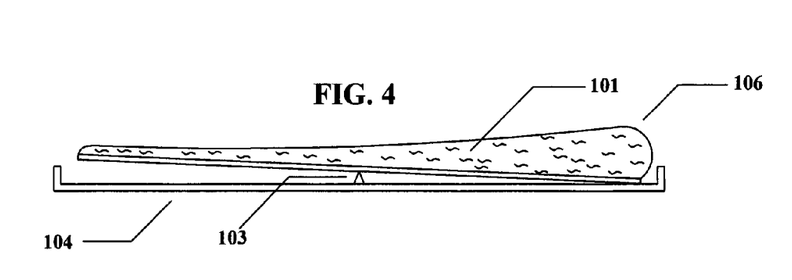

The second component of the apparatus is a containing enclosure featuring an unobstructed internal cavity 102. The containing enclosure purpose is to serve as a container for the energy transfer medium. In the embodiment depicted in FIG. 1-A and FIG. 1-B the containing enclosure is shaped as a rigid circular cylinder. But in other embodiments it could take other shapes (e.g., ellipsoid cylinder, square box, rectangular box). It could also take the form of a flexible membrane 106 as shown in FIG. 4. This flexible membrane would be composed of a flexible material (e.g., rubber, plastic), that would be affixed to a rigid circular shaped foundation.

Figure 6:
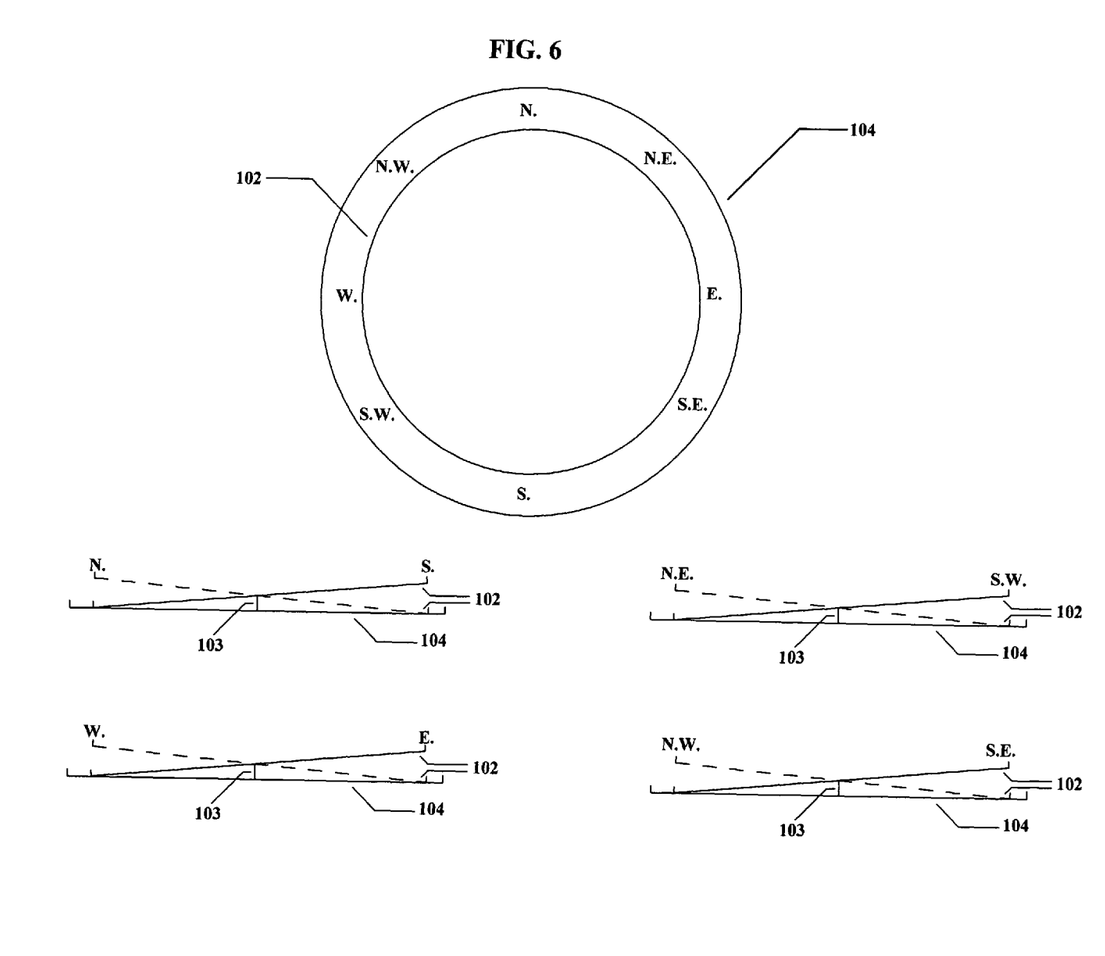
Figure 7:
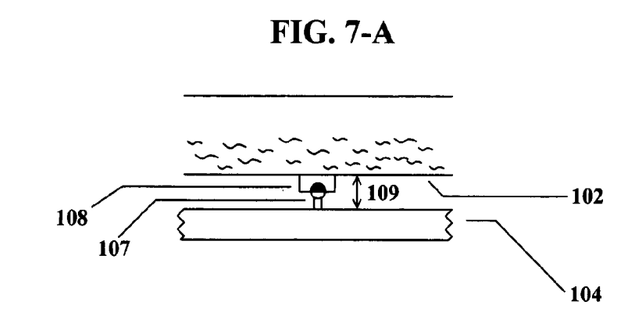

The third component of the apparatus is a pivoting rotating element 103 joint, and it is a component that structurally serves two functions. FIG. 7-A and FIG. 7-B are used to illustrate these two functions. The first is to link the containing enclosure to the fifth element of the apparatus, a base 104. While the second structural function is to create a gap 109 between the base and the containing enclosure. At present I envision the configuration of the pivoting rotating element to be a rod 107 rotatable retained by a holding element 108. It will connect on one end to the center point of the downward positioned face of the containing enclosure, as shown in FIG. 7-A, or the upward positioned face of the containing enclosure, as shown in FIG. 7-B. And on its other end it will be secured to an opportune position on the base. Operationally the pivoting rotating element will function as illustrated in FIG. 6. It will permit the containing enclosure to have a range of pivoting rotating movement that is limited only by the containing enclosures contact with the base. And this movement will be made possible by the gap the pivoting rotating element creates between the base and the containing enclosure.

The fourth component of the apparatus is a series of energy collecting devices 128. And their purpose would be to transform the undulating movements of the containing enclosure via the pivoting rotating element into useful energy. They would be positioned as shown in FIG. 1-A and FIG. 1-B, in a 360 degree arc on the base and separated equidistrautly at the points on the base or adjacent to the points on the base where the fall of the containing enclosure would intersect the base. The positioning of these devices will ensure that energy will be harvested irregardless of the originating direction of the wave when it encounters the apparatus. The series of energy collecting devices themselves will be mechanically based, pneumatically based or hydraulically based. They could take the form of a linear electric generator that directly utilizes reciprocating mechanical movement and directly transforms that movement into it into electricity. Or it may be a hydraulic system consisting of a hydraulic cylinder, a hydraulic accumulator and a hydraulic motor. Or it might be a linear gear that would engage a circular gear that would be coupled to a generator. Or a pneumatic piston similar to that which is in use in gasoline engines, the crankshaft would terminate at a generator which it would rotate.

Figure 2:
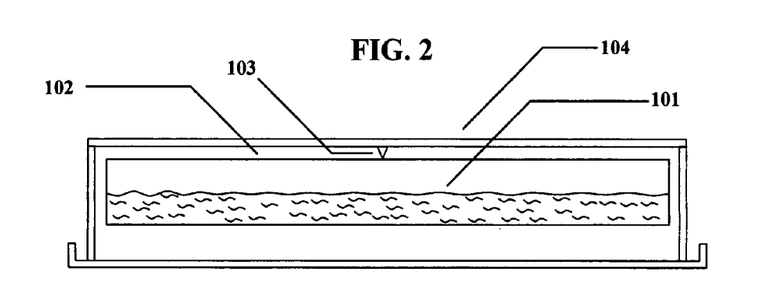

The base is the fifth component of the apparatus and its purpose is to serve as the support for the apparatus. In most embodiments it is positioned below the other components that makeup the apparatus. But as illustrated in FIG. 2, it may be positioned above them if necessity dictates. The base itself can be a floating structure featuring a horizontal surface that has the ability to withstand the waves present in a body of water and perform by its own means (e.g., buoy). Or it may be used to secure the apparatus to a floating structure featuring a horizontal surface that has the ability to withstand the waves present in a body of water and perform by its own means (e.g., boat, ship).

Operation—FIGS. 1-A, 1-B, 8, 9, 10, 11, 12

The following sections focus on the operation of the embodiment depicted in FIG. 1-A and FIG. 1-B. They can be used as an analogy of how all embodiments are intended to function.

Figure 8:
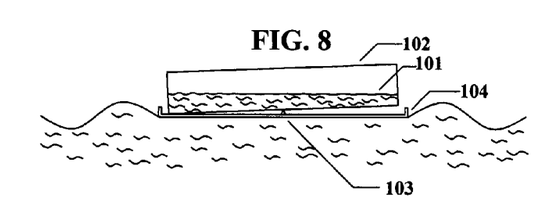
Figure 9:
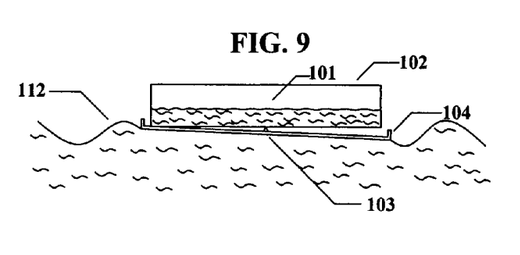

The embodiment depicted in FIG. 1-A and FIG. 1-B positions the base below the containing enclosure and uses a liquid as the energy transfer medium. FIG. 8 depicts the embodiment at rest and undisturbed at the commencement of an encounter with a wave. FIG. 9 depicts the initiation of the embodiments encounter with a wave crest 112. The encounter starts with the wave crest forcing the adjacent section of base 104 to rise so as to close the gap, if there is any, between the base and containing enclosure 102, via the pivoting rotating element. The wave crest will then proceed to force the base to push upward against the adjacent section of the containing enclosure. This will elevate the adjacent section of the containing enclosure to a height that is comparatively higher than the then current position of pivoting rotating element 103. And create an outcome that will orient the containing enclosure downward with respect to the horizontal plane, toward an area of the base that is directly opposite the wave crest.

Figure 10:
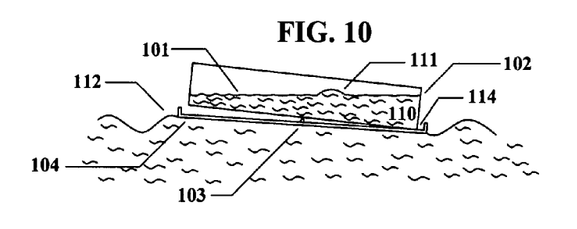

As a consequence of this, two events will be set into motion. FIG. 10 is used to illustrate these events. The first of which has energy transfer medium 101 reacting by displacing an appropriate volume of liquid toward the area of the containing enclosure directly opposite of wave crest 110. This will have the effect of creating a weight imbalance in that area of the containing enclosure. The second is that some of the energy and movement of the wave under consideration will be replicated in the containing enclosure on the surface of the energy transfer medium. This replicated wave 111 will then proceed to flow to the area of the containing enclosure directly opposite of the wave crest, where it will temporally add to the weight imbalance already created there.

The combination of the two events will create enough force to induce the containing enclosure to descend, via the pivoting rotating element, onto the base at impact position 114 which is located directly opposite of the wave crest. And it is the collective displaced mass of the two events when coupled with the momentum the containing enclosure accumulates as it falls on to the base that determines how much energy can be harvested by series of energy collecting devices 128 from the crest of each wave.

Figure 11:
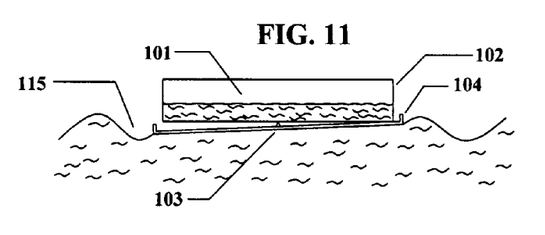

An encounter with a wave trough 115 is depicted in FIG. 11. This encounter begins with the wave trough allowing the area of the base adjacent to the trough to descend. This will have the effect of forcing the section of the base directly opposite the trough to rise to a height that is comparatively higher than the then current position of the pivoting rotating element. As a result, the containing enclosure will be orientated downward with respect to the horizontal plane, toward the section of the base that is directly above the wave trough.

Figure 12:
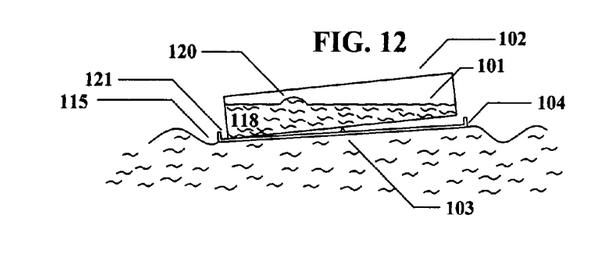

As with the crest of the wave the trough of the wave will also set into motion two events. FIG. 12 is used to illustrate these two events. The first event has the energy transfer medium displacing an appropriate volume of liquid toward area of the containing enclosure directly above the wave trough 118. This will have the effect of creating a weight imbalance in that area of the containing enclosure. The second event involves replicating some of the energy and movement of the wave under consideration in the containing enclosure on the surface of the energy transfer medium. This replicated wave 120 will then proceed to flow in the opposite direction of the originating wave towards the area of the containing enclosure that is situated directly above the wave trough. This will have the effect of temporally magnifying the weight imbalance created there.

When these two events are combined they create the force needed to induce the containing enclosure to descend, via the pivoting rotating element, onto the base at a impact position 121 that is located directly above the wave trough. And it is the combined displaced mass of the two events when coupled with the momentum the containing enclosure accumulates as it falls on to the base that determines how much energy can be harvested by the series of energy collecting devices from the trough of each wave.

Other Embodiments

Figure 5:
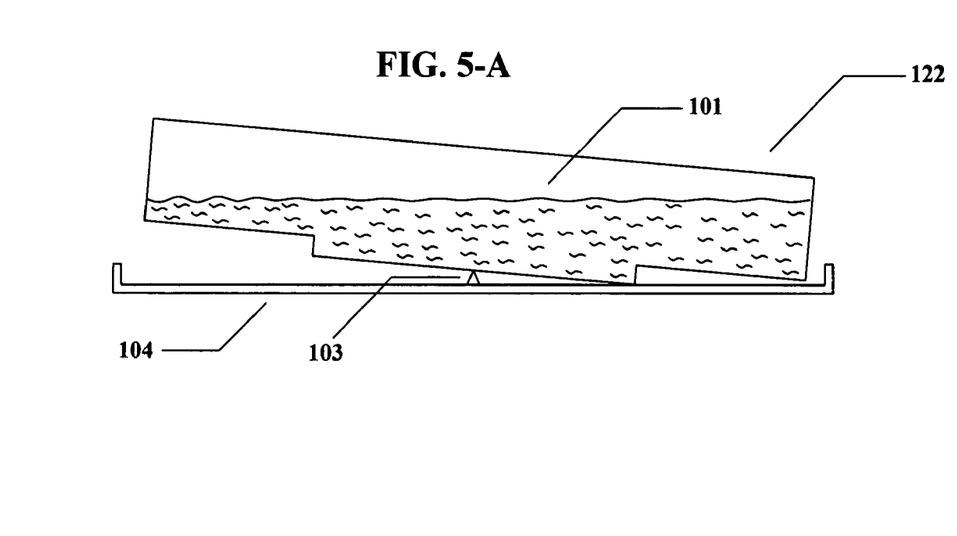

FIGS. 3, 4, 5-A, 5-B, 14, 15, 16

The embodiment depicted in FIG. 3 differs from the embodiment depicted in FIG. 1-A and FIG. 1-B in that a dense rolling element 105 is used as the energy transfer medium. This configuration increases the energy available to be harvested, primarily because entire mass of the energy transfer medium is being put toward the task of creating energy. Whereas, if the energy transfer medium was a liquid or a fluidic gel, only a portion of the material would at any one time be put towards this task. When in operation the embodiment will tend to work best in areas where large waves with long wave lengths are prevalent. This is because this type of environment will allow the embodiment the time needed to full respond to the energy being imparted by the waves.

The embodiment depicted in FIG. 4 uses a flexible membrane 106 as the containing enclosure, and a liquid, or a fluidic gel as the energy transfer medium. This configuration will allow the embodiment to retain the advantages of a fluidic or fluidic gel like energy transfer medium. Which is primarily the ability to quickly respond to the activities of waves. While gaining an advantage inherent in having a containing enclosure that is flexible, which is the capacity to displace a larger volume. When in operation the embodiment will be inclined to work best in areas such as sheltered coasts where smaller waves are prevalent. This environment will also help to reduce the stress placed on the flexible structure of the containing enclosure when it is in operation, without appreciably diminishing its output.

Figure 14:
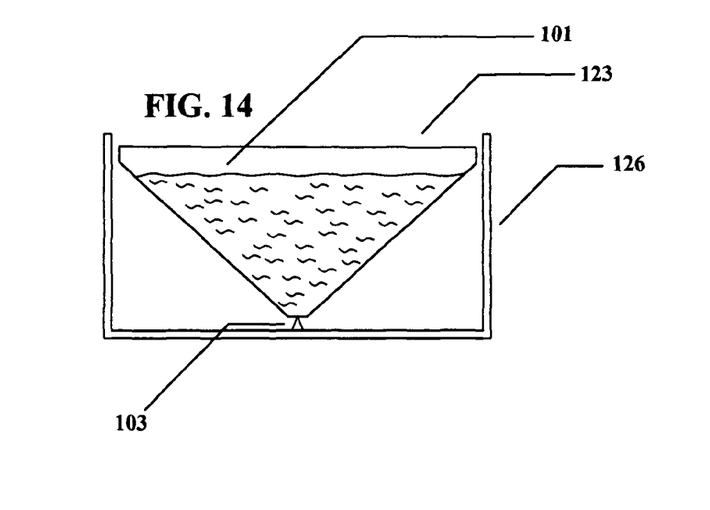

The embodiment depicted in FIG. 14 utilizes a cone shaped containing enclosure 123 and makes use of a liquid or a fluidic gel as its energy transfer medium. It also utilizes a very high side wall 126 that is a component of its base, as one of the controlling factors in determining the containing enclosures range of movement via the pivoting rotating element. This design permits the embodiment to be slimmer and taller than other versions of the apparatus, thus allowing this embodiment to be such more susceptible to the motions ocean waves. When in operation the embodiment will be inclined to work best in all wave conditions but would be ideally situated in deep waters.

Figure 15:
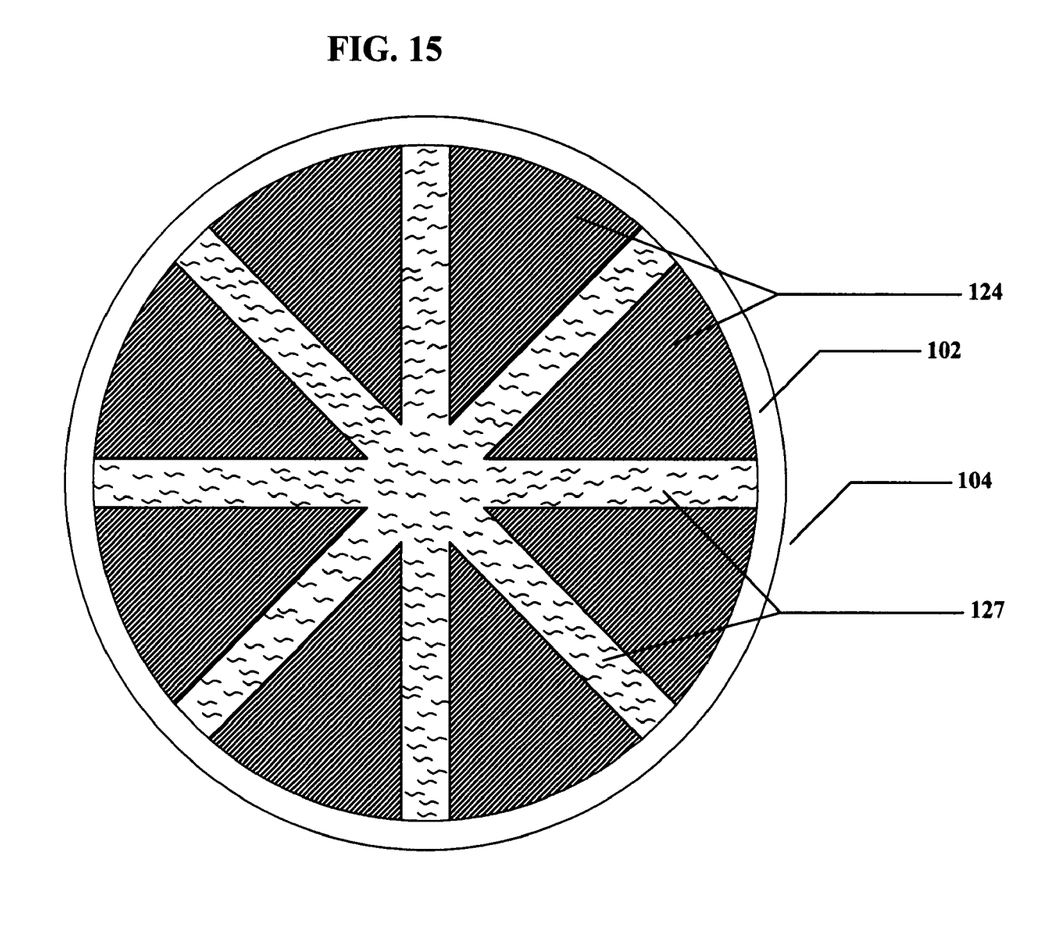

The embodiment depicted in FIG. 15 incorporates a containing enclosure that utilizes a series of channels 127 that originate at the center of the containing enclosure and terminate at uniform intervals along the edges of the enclosure. Each of these channels would enclose an identical volume of space that would be occupied by either a liquid or a rolling element. A solid substance 124 would ideally be used in order to occupy the sections of the containing enclosure not enclosed by these channels. The effect of this arrangement would be to greatly increase the overall mass of the containing enclosure. This will increase the potential amount of energy that could be harvested. When in operation this embodiment will be inclined to work in all wave conditions and on a wide variety of floating platforms.

Figure 16:
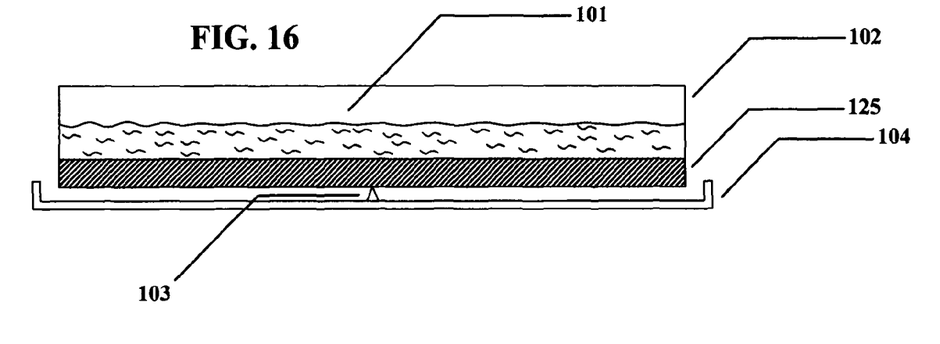
Figure 17:
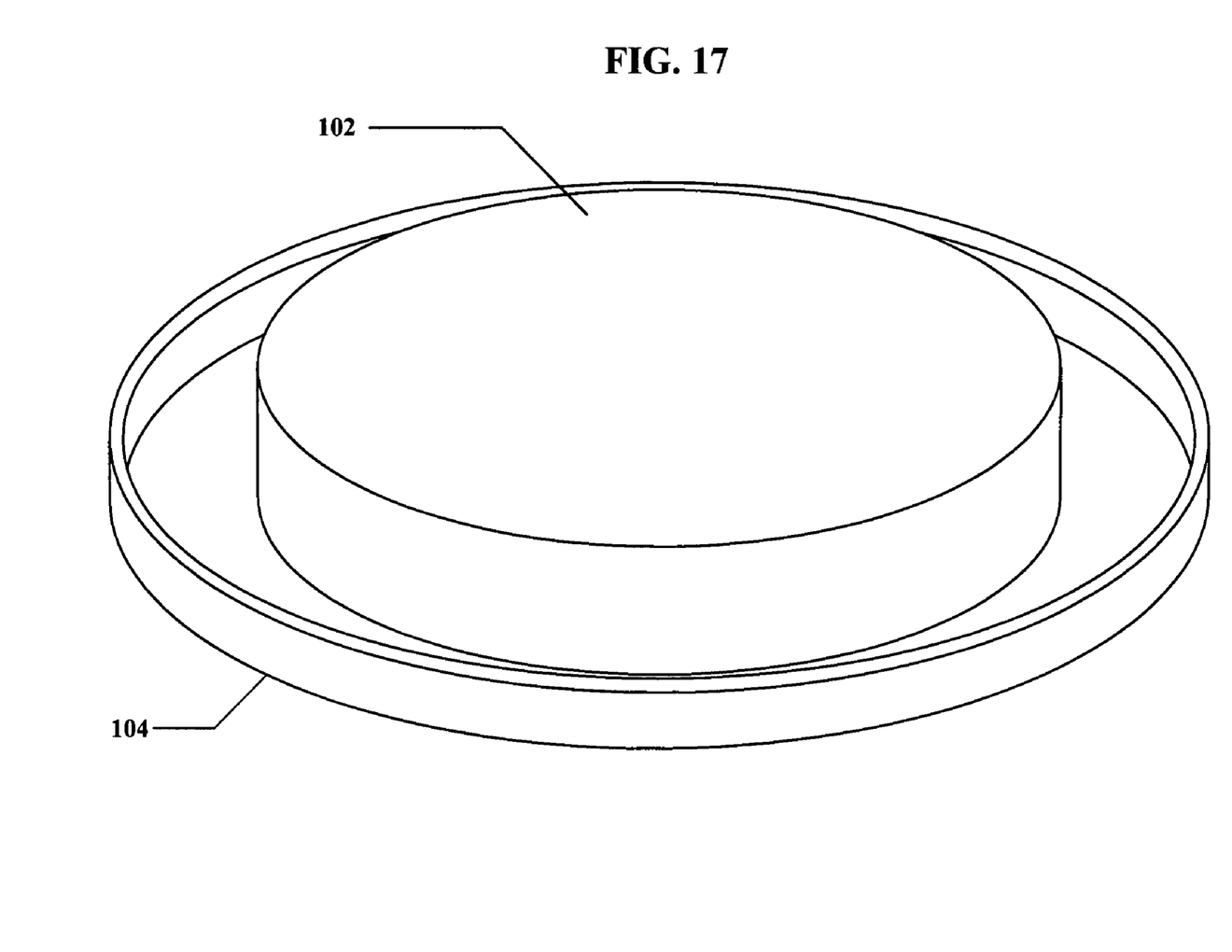

The embodiment depicted in FIG. 16 incorporates a solid material 125 that is securely positioned between the containing enclosure and the pivoting rotating element. The pivoting rotating element is aligned with the center point of one face of this solid material. While the center point of the opposite face is aligned with the center point of the containing enclosure. This arrangement allows the containing enclosure to control equilibrium of the solid material when the embodiment is in operation. And this arrangement will increase the mass of the section of the apparatus that would be put into motion when in the presence of ocean waves. This in turn will increase the potential amount of energy that could be harvested from the embodiment. When it is in operation this embodiment will be inclined to work in all wave conditions and on a wide variety of floating platforms.

The embodiment depicted in FIG. 5-B features a beveled containing enclosure 116 whose lower face is beveled. While the embodiment depicted in FIG. 5-A features a stair shaped containing enclosure 122 whose lower face is stair shaped. These arrangements will permit the overall size of both embodiments to be normal while at the same time allowing the radius of the circular impact points on their base to be smaller they otherwise would be. The significance of these changes is personified in both embodiments' ability to not only operate in areas that have a preponderance of large waves, which would be an ideal environment in terms of their overall size. But also to operate in areas that feature preponderance of small waves via the beveled and the stair shaped undersurface of their containing enclosures. The dexterity that these embodiments display in their range of operational environments will provide cost saving opportunities during their production and when they are in operation.

CONCLUSIONS AND RAMIFICATIONS

It can be stated that this apparatus is intended to be a simple easy way of harnessing the energy inherent in waves and sea swells. Its basic construction lends itself to a number of advantages that include the ability to move large masses in order to create mechanical movement;

the ability to be situated on a variety of floating vessels;

the ability to operate in areas that are prevalent in both large and small waves;

simplicity and robustness of design;

and by installing a dome (not shown) on the apparatus its moving parts can be easily sealed from the corrosive and violent effects of the sea;

In summation the above specification should not be construed as limiting the scope of the embodiment. But should be seen a merely providing illustrations of some of the preferred embodiments. Thus the scope of the embodiment should be determined by the appended claims and their legal equivalents, rather than by the examples given.

I claim:

1. A wave energy converter comprising:
   a floating base positioned on a body of water;
   a containing enclosure featuring an unobstructed internal cavity;
   a fluid contained in the internal cavity;
   a ball and socket connecting a central point of the floating base to a central point of the containing enclosure; and
   a series of energy collectors positioned on the floating base at points of contact between the floating base and containing enclosure,
   wherein the ball and socket creates a gap between the floating base and containing enclosure that allows the containing enclosure to pivot and rotate around the ball and socket to contact the energy collectors in response to wave motion.

2. The wave energy converter of claim 1, wherein said fluid is water.

3. The wave energy converter of claim 1, wherein said fluid is a fluidic gel.

4. The wave energy converter of claim 1, wherein said containing enclosure has a cylindrical shape.

5. The wave energy converter of claim 1, wherein said containing enclosure comprises a rigid material.

6. The wave energy converter of claim 5, wherein said rigid material is steel.

7. The wave energy converter of claim 1, wherein said containing enclosure is a flexible material affixed to a rigid foundation.

8. The wave energy converter of claim 7, wherein said flexible material is rubber.

9. The wave energy converter of claim 1, wherein said ball and socket is coupled to said containing enclosure by way of the center point of the lower surface of said containing enclosure.

10. The wave energy converter of claim 1, wherein said ball and socket is coupled to said containing enclosure by way of the center point of the upper surface of said containing enclosure.

11. The wave energy converter of claim 1, wherein said series of energy collectors are mechanical.

12. The wave energy converter of claim 1 wherein said series of energy collectors are pneumatic.

13. The wave energy converter of claim 1 wherein said series of energy collectors are hydraulic.

14. The wave energy converter of claim 1, wherein said floating base is a boat.

15. A wave energy converter comprising:
    a floating base positioned on a body of water;
    a containing enclosure featuring an unobstructed internal cavity;
    a rolling sphere contained in the internal cavity;
    a ball and socket connecting a central point of the floating base to a central point of the containing enclosure; and
    a series of energy collectors positioned on the floating base at points of contact between the floating base and containing enclosure,
    wherein the ball and socket creates a gap between the floating base and containing enclosure that allows the containing enclosure to pivot and rotate around the ball and socket to contact the energy collectors in response to wave motion.

16. The wave energy converter of claim 15, wherein said rolling sphere is made from a material selected from a group consisting of metal, glass, crystal, ceramic, and stone.

17. The wave energy converter of claim 15, wherein said containing enclosure has a cylindrical shape.

18. The wave energy converter of claim 15, wherein said ball and socket is coupled to said containing enclosure by way of the center point of the undersurface of said containing enclosure.

19. The wave energy converter of claim 15, wherein said ball and socket is coupled to said containing enclosure by way of the center point of the upper surface of said containing enclosure.

20. The wave energy converter of claim 15, wherein said floating base is a boat.

* * * * *